United States Patent [19]

Boehm et al.

[11] Patent Number: 4,948,602

[45] Date of Patent: Aug. 14, 1990

[54] FILLED COOKIE

[75] Inventors: Donald G. Boehm, Mt. Kisco, N.Y.; Richard D. Fazzolare, Randolph, N.J.

[73] Assignee: Nabisco Brands, Inc., East Hanover, N.J.

[21] Appl. No.: 261,163

[22] Filed: Oct. 21, 1988

[51] Int. Cl.$^5$ .............................................. A21D 15/00
[52] U.S. Cl. ...................................... 426/94; 426/281; 426/283; 426/237; 426/242; 426/243
[58] Field of Search ................. 426/94, 281, 283, 237, 426/243, 242

[56] References Cited

U.S. PATENT DOCUMENTS

| | | | |
|---|---|---|---|
| 1,817,114 | 8/1931 | Valenta . | |
| 3,450,538 | 6/1969 | McKown et al. | 99/81 |
| 3,764,715 | 10/1973 | Henthorn et al. | 426/273 |
| 3,830,948 | 8/1974 | Fischer et al. | 426/281 |
| 4,104,405 | 8/1978 | Forkner | 426/94 |
| 4,209,536 | 6/1980 | Dogliotti | 426/94 |
| 4,251,551 | 2/1981 | VanHulle et al. | 426/94 |
| 4,409,250 | 10/1983 | VanHulle et al. | 426/242 |
| 4,525,367 | 6/1985 | Allison | 426/394 |
| 4,563,358 | 1/1986 | Mercer et al. | 426/89 |
| 4,579,744 | 4/1986 | Thulin et al. | 426/283 |
| 4,596,713 | 6/1986 | Burdette | 426/107 |
| 4,613,508 | 9/1986 | Shishido | 426/281 |
| 4,693,899 | 9/1987 | Hong et al. | 426/94 |
| 4,752,494 | 6/1988 | Tang et al. | 426/573 |
| 4,762,723 | 8/1988 | Strong | 426/283 |

FOREIGN PATENT DOCUMENTS 61-56973 12/1986 Japan .

*Primary Examiner*—Donald E. Czaja
*Assistant Examiner*—Mary S. Mims

[57] ABSTRACT

A baked cookie is produced having a two phase interior filling. There is an oil based interior filling and a water based interior filling. The oil based interior filling coats at least part of the interior of the biscuit and enhances the taste of the cookie. Upon this cookie being heated in a microwave oven the water based filling expands and exudes out through the top of the cookie flowing down the exterior surfaces of the cookie and coating these surfaces. This cookie is produced by co-extruding a dough and the oil based filling. The dough piece is than baked whereby there is formed a hollow interior section. It is this hollow interior section that is then filled with the water based filling.

18 Claims, No Drawings

FILLED COOKIE

BACKGROUND OF THE INVENTION

This invention relates to filled cookies. More particularly, this invention relates to filled cookies where upon heating in a microwave oven part of the filling contained in the cookie expands upwardly through the top of the cookie and spreads downwardly along the outside surfaces of the cookie.

The present cookie is a type of cookie which when baked has the appearance of a volcano erupting. What is occurring is that part of the filling within the cookie is expanding due to the energy being applied and is heated and flowing upwardly through openings or through a weakened area in the top of the cookie, and then flows downwardly along the cooler outside portion of the cookie. As the filling cools it increases in viscosity and the downward flow decreases. The end result is a cookie that was originally in the shape of a volcano and which now has part of the filling of the cookie distributed around the outside of the cookie. However, if it is not desired to heat the cookie and have part of the filling exude from the cookie, it can be consumed directly from the package.

The present cookies are unique in that they are shelf-stable at room temperature for extended periods of time. The biscuit portion of the cookie is fully baked with the consumer only heating the cookie in a microwave oven to have the filing flow out of the cookie and down the exterior surface. However the consumer will still get much of the taste and effect of fresh baked cookies. There is also the advantage that this is a very unique cookie. When the cookie is placed in the oven it is fully baked and contains both a flavored oil based filler and a flavored water based filler. The flavored water based filler is placed on the oil based filler and is the primary ingredient which expands upon the application of heat and exudes from the top of the cookie. However, there is a partial coating of the oil based filler on the inside of the cookie. While the water based filler in the cookie is expanding and flowing down the outside of the cookie the biscuit portion of the cookie is being warmed. After heating, the cookie is partially cooled prior to being consumed for the reason is that the oil based filler within the cookie and the remaining water based filler in the cookie remain at elevated temperatures with some cooling advisable before consumption.

In this cookie there must be a combination of an oil based filler and of a water based filler. If only a water based filler were to be used the cookie would not have as long a shelf life. It is also possible that too much of the water based filler would exude from the top of the cookie. It is also the case that an emulsion type of filler cannot be as effectively utilized. Again, the reason is that there could be an excessive exuding of the filler from the cookie. It is therefore necessary that there be a combination of an oil based filling and a water based filling. The oil based filling will remain in the cookie as a control of the amount that exudes on heating and will in addition contribute to the taste of the cookie. Since the water based filling is activated at a lower temperature than the oil based filling it will thus expand and flow from the cookie at a lower temperature. This latter factor is also important so that the cookies can be consumed fairly soon after baking.

There are various filled cookies in the market place. The most famous of the filled cookies is probably the sandwich cookie that is sold under the registered trademark OREO. These sandwich cookies have also been coated with various chocolate and fudge coatings. Consequently, at this point in time filled cookies of the sandwich type, and filled cookies of the sandwich type which are enrobed in a chocolate or fudge coating are known. However, these cookies are fully prepared by the manufacturer with no further steps of preparation remaining for the consumer. Further these cookies are consumed at room temperature.

In U.S. Pat. No. 4,104,405 there is disclosed a food product which is comprised of an edible shell of cooked dough having an expanded confection extending around or bonded to the shell. The shell itself can be an ice cream cone. This expanded confection is preferably produced by molding the expanded confection in place on the edible shell. The molded section can contain marshmallow and hard candy bits. This molded section is expanded through the use of a partial vacuum. The partial vacuum causes included air and gases to expand and to impart an expanded confection layer to the upper surface of the shell.

U.S. Pat. No. 4,525,369 discloses a technique for expanding a food product by the rapid reduction of pressure on the food product. The food product to be expanded will have a water content of about 5 to 50% by weight. Upon heating and the rapid release of pressure the water expands as steam and causes the food product to expand. It is a rapid reduction of pressure that causes the food to expand and not merely a heating. Various food products can be expanded using this technique.

U.S. Pat. No. 4,596,713 discloses a method for preparing popcorn where the popcorn is coated with a flavorant which is contained in a separate packet during the popcorn cooking cycle. As the popcorn containing package is heated in a microwave oven the portion that contains the additive or flavorant becomes heated and the part of the package in which it is contained ruptures. Upon rupturing the additive or flavorant is coated onto the expanding popcorn. The mechanism here that is used in producing an expanded coated product is for a part of the package to rupture and to spread the flavorant or other additive.

U.S. Pat. No. 4,693,899 discloses a method for preparing a filled, cooked dough product. The composite consists of an uncooked, yeast leavened, sugar containing dough around a cooked freeze/thaw stable viscous filling comprised of food ingredients and a sauce therefor containing a water-binding carbohydrate. The product is reheated prior to consumption. The reheating comprises conventional oven heating either simultaneously with or following microwave heating. This heats the product, creates an outer crust and returns the frozen product to the appearance and texture of the freshly cooked product. In this patent there is disclosed a filled dough product where the dough will not get soggy and lose its texture. However, there is no expansion of the filler material. The filler material is thawed, but remains within the dough portion of the baked good.

In addition there are filled hard dough biscuits such as those that are disclosed in U.S. Pat. No. 4,613,508. In this patent there is disclosed the baking of a biscuit which upon baking will expand with a percentage of leavening in excess of 280. What is produced is a hollow hard biscuit. This hollow hard biscuit is then filled with a filling, such as a chocolate or chocolate cream filling, by means of needle injection. In needle injection a needle in the form of a hypodermic needle inserts the filling into the biscuit.

This patent puts several constraints on the type of dough that can be utilized in order to form the hard biscuit. It is stated that it is not desirable to use a cereal dough containing proportions of ingredients such as a cereal dough used for producing soda crackers or cream crackers. It is also stated that if a cereal dough is prepared with excess sugar, for example, as a cereal dough prepared by mixing 40 parts by weight of sugar, 15 parts by weight of oil or fat and 17 parts by weight of water with 100 parts by weight of wheat flour the resulting baked product will be hard and will give poor feeling during eating. In the instance where the cereal dough is prepared with an excess of oil or fat the resulting baked product will be crumbly, and thus susceptible to breaking-up during the step of the injection of the filler. If it is desired to decrease the amount of sugar and oil or fat and instead to increase the proportion of overall water in order to adjust the hardness of the cereal dough there will result a baked product which is also susceptable to breaking during the step of the injection of the filler. In this patent it is therefore prescribed to use from about 10 to 30 parts by weight of sugar, 10 to 25 parts by weight of oil or fat and 35 to 20 parts by weight of water per 100 parts by weight of cereal flour. This is the composition that is noted to produce biscuits which are sufficiently hard so that they can withstand the penetration of a filling needle without breaking.

However, even though this is a filled cookie in U.S. Pat. No. 4,613,508 it is a filled cookie that is purchased in a fully prepared condition. Also the filling remains within the biscuit. This is in contrast to the present invention wherein the filled cookie is heated in a microwave oven by the consumer so that the consumer can have the advantage of having the taste of hot fresh baked cookies.

BRIEF DESCRIPTION OF THE INVENTION

The present invention is directed to a baked filled cookie which upon further heating will have some of the contained filling exude out of the top of the cookie and to flow down the outer sides of the cookie. The cookie itself in some ways has the appearance of a volcano. The cookie contains within its structure an oil based flavored filler and a water based flavored filler. The oil based flavored filler is situated under the water based filler and also at least partially coats the inner walls of the biscuit. Above the water based filler there are either one or more small openings or a scribed weakened area. It is through these openings, and/or the scribed weakened area that the expanding water based filler will exude from the cookie.

During the final preparation of the cookie the cookie is heated in a microwave oven. At an initial stage the biscuit portion of the cookie becomes heated followed by the exuding of the water based filler down the outer sides of the biscuit portion. The oil based filler will essentially remain within the cookie. The reason is that it would take an increased temperature for the oil based filler to become sufficiently heated to also exude from the cookie.

A primary function of the oil based filler, besides providing an enhanced taste, is to provide the cookie with an extended shelf life. This cookie will be stored at room temperature. The oil based filler is the filler that is in contact with a substantial part of the interior portion of the biscuit. The oil based filler also helps to prevent the water based filler from becoming partially dried out with the result that a decreased amount would exude from the biscuit under microwave heating.

The biscuit portion of the cookie can be of various types. This can be a white biscuit cake, a chocolate biscuit cake or a graham biscuit cake. The biscuit portion of the cookie is formulated from ingredients that are known in the art of cookie making. In the first step the desired cookie dough is fully mixed. After the cookie dough has been mixed it is co-extruded with the oil based filler. During the co-extrusion step the oil based filler is encapsulated within the biscuit dough. These biscuit dough pieces containing encapsulated oil based filler are then baked. During baking the biscuit portion of the co-extrusion expands to about 1.5 to 2 or more times its original size. This then provides for additional spacing within the biscuit. It is this additional spacing that is then filled with the water based filler. The water based filler is injected into the biscuit by means of needle injection. The cookie is now in a condition of having been fully prepared for subsequent consumption by the consumer, or heating and consumption by the consumer.

DETAILED DESCRIPTION OF THE INVENTION

The present filled cookie is very unique in that the consumer will complete the preparation of the cookie and during the heating of the cookie some of the contained filler will exude out of the top of the cookie and coat down along the outer sides of the cookie. In many instances the cookie will have the shape of a volcano and when the cookie is heated and the filler exudes from the cookie it is suggestive of a volcano erupting. The net result is a hot filled cookie which has part of the contained filling down along the outside of the biscuit surface. This has the advantage of spreading the flavored water based filler over the exterior surfaces of the cookie to provide for a better taste and appearance. In addition, there is the aspect of the consumer having a meaningful input into the preparation of the cookie. The cookie can be formulated from a number of different types of flavored doughs. The objective is to produce a hard biscuit. This biscuit can be white and vanilla based, chocolate based, or graham based. The main requirement for the dough is that upon baking that it will rise so that a water based filling can be inserted into the newly created space. The cookie itself is an outer biscuit portion which is at least partially coated on its interior surface with an oil based filler. This oil based filler coats at least some of the interior surface of the cookie, with the remainder sitting in the bottom of the cookie, leaving a center void area for the insertion of the water based filler. After the biscuit with the oil based filler is baked the water based filler is inserted into the cookie by means of a needle injection technique. The finished cookie contains one or more holes in the top portion of the cookie or a scribed weakened part in the top portion of the cookie. This is provided so that when the water based filler expands upon the application of heat that it will exude out of the cookie at certain places and flow down the outside of the cookie.

Upon the purchase of the cookies the consumer need only place the cookies in a microwave oven. As the cookie or cookies are heated the water based filler will undergo an expanding type of reaction and cause a portion of the water based filler to exude out of the upper opening or weakend area opening and down the outside of the cookie. After the cookies have been heated they are removed from the oven and cooled for a period of time before consumption. The cookies usually must be cooled since the filling within the cookie is still at an elevated temperature.

In the manufacture of the present cookies three different ingredients must be separately prepared. These are the biscuit dough, the oil based filler and the water based filler. A typical vanilla based biscuit dough will contain wheat flour, sugar, vegetable shortening, corn syrup, dry whey, whole eggs, salt, egg albumen, starch, water and a chemical leavening agent. A chocolate based dough will contain essentially the same ingredients but with the addition of cocoa and chocolate liquor flavorants. Based on 100 parts by weight of wheat flour the vanilla biscuit dough will contain about 20 to 35 parts by weight of fine granulated sugar, about 20 to 30 parts by weight of vegetable shortening, about 12 to 25 parts by weight of corn syrup, and about 0.5 to 2 parts by weight of each of dry whey, dry whole eggs, salt, egg albumen, starch and chemical leavening agent. The vanilla dough composition will also contain about 15 to 20 parts by weight of water. The major ingredients for the chocolate dough are very similar as for a vanilla dough. The main differences are in the added flavorants. In the formation of the dough all of the ingredients except the water, flour and chemical leavening agent are mixed to form a cream like substance. This includes the mixing of the fine ground sugar, vegetable shortening, starches, corn syrup, whey powder, salt, cocoa and other flavors, dry whole eggs and dry egg albumin. These are mixed together in a high shear mixer. After these substances have been thoroughly mixed, which will take from about 3 to 15 minutes depending on the mixture, the water is added and the intensity of mixing is decreased. The mixing is continued until the water is fully mixed into the creamed mixture. At this point the flour and chemical leavening agent are added and the low intensity mixing is continued. This is continued for a time of about 2 to 10 minutes until the dry flour and chemical leavening agent have been thoroughly mixed into the dough. At this point the dough is fully formed and is allowed a resting time of about 10 to 25 minutes.

If it is desired to have a graham biscuit type of product a similar formulation is utilized with the exception that graham flour is substituted for part of the wheat flour and that honey and molasses are substituted for some of the corn syrup and for some of the fine granulated sugar. Based on 100 parts by weight of flour wherein the graham flour can constitute from about 20 to 40 parts by weight of the flour mixture there is added 15 to 25 parts by weight of sugar, 8 to 15 parts by weight of vegetable shortening, 6 to 15 parts of weight of molasses and/or honey, 5 to 10 parts by weight of high fructose corn syrup, 2 to 4 parts by weight of a leavening agent, 1 to 2 parts by weight of salt and 15 to 25 parts by weight of water. The technique of forming the graham biscuit dough is very similar to that utilized for forming the vanilla dough or the chocolate dough. The only difference is that ammonium bicarbonate is used as a component of the chemical leavening agent and this is added with the water rather than with the dry flour ingredients.

No sheeting or other processing is required in the processing of the dough. After the dough is formed it can be allowed to set for a period of time before it is fed to the extruder to make the oil based filling filled dough pieces. After the preparation of the dough there must be prepared the oil based filler. This is the case since the cookie dough and the oil based filler are coextruded to form the biscuits. The oil based filler consists of a mixture of fine granulated sugar, vegetable oil, peanut oil, hazel nut paste, dry whole milk powder, monoglyceride, lecithin and flavorant. The flavorant can be vanillin, chocolate, cocoa, a fruit flavorant, such as strawberry, cherry, orange, lemon, lime or the like, a nut flavorant such as peanut, cashew, almond or the like or mint. Essentially any type of flavorant, or mixture of flavorants can be used so as to impart a particular taste. Based on 100 parts by weight of fine granulated sugar the composition for a chocolate flavorant filler will contain from about 46 to 65 parts by weight of vegetable oil, such as soybean oil, from about 30 to 40 parts by weight of cocoa, from about 25 to 40 parts by weight of peanut oil, from about 12 to 20 parts by weight of hazel nut paste, from about 4 to 10 parts by weight of dry whole milk powder, from about 4 to 8 parts by weight of a monoglyceride, and from about 0.5 to 2 parts by weight of lecithin. These ingredients are then mixed together. The order of addition and mixing is not critical. However, the vegetable oil and lecithin are usually added last. After mixing all of the ingredients except the vegetable oil and lecithin this mixture is then transferred to three roll milling equipment and further processed. At this point the vegetable oil and lecithin are added. The oil based chocolate filler is then stored in a suitable container for subsequent use.

The water based filler consists of two primary ingredients. One of the ingredients is the marshmallow syrup. The other ingredient is the flavored filler. The marshmallow syrup is prepared by mixing 100 parts by weight of corn syrup with about 170 to 200 parts by weight of high fructose corn syrup, about 2 to 6 parts by weight of gelatin, up to about 0.5 parts by weight of vanillin and from about 10 to 20 parts by weight of water. In order to make the marshmallow syrup, the corn syrup and high fructose corn syrup are heated together and mixed. These are heated to a temperature of about 115° F. to about 140° F. After the corn syrup mixture has reached this temperature then a mixture of the gelatin, vanillin and water are added to the corn syrup mixture. After the addition is complete the final mixture is flowed to a holding tank and maintained at about 85° F. to 95° F. This marshmallow filler can be used alone or mixed with various flavorants. Any of the flavorants that can be mixed with the oil based filler can be used with the water based filler. The same flavorant can be used in the oil based filler and the water based filler or different flavorants can be used in each to impart a unique taste.

One flavorant with which the marshmallow syrup may be utilized is a chocolate flavorant to form a chocolate filler. Based on 18 parts by weight of fine granulated sugar the chocolate filler consists of about 4 to 6 parts by weight of tapioca starch, about 3 to 7 parts by weight of powdered dextrose monohydrate, about 2 to 4 parts by weight of cocoa, about 0.25 to 1 part of salt, a minor amount of natural chocolate flavor, about 15 to 20 parts by weight of high fructose corn syrup, about 25 to 35 parts by weight of corn syrup, about 15 to 25 parts by weight of water, about 4 to 8 parts by weight of chocolate liquor, about 3 to 7 parts by weight of cocoa compound, about 10 to 15 parts by weight of vegetable shortening, and a minor amount of lecithin. These ingredients when properly mixed and blended will produce the water based chocolate filler for the cookie. The mixing technique consists of mixing the dry ingredients in a kettle. These consist of mixing together the fine granulated sugar, tapioca starch, powered dextrose monohydrate, cocoa, salt, lecithin, and natural chocolate flavor. Added to this blend is the high fructose corn syrup, the corn syrup and water. These are mixed under heating to produce a uniform blend. After these ingredients have been fully blended a portion of the marshmallow syrup is added to this chocolate filler mixture and further mixed. These are the primary ingredients in the manufacture of the present cookie. The next step is to form the cookie itself.

In the formation of the cookie itself, the cookie dough and the oil based filler are co-extruded. Any convenient co-extrusion apparatus can be used but a Rheon co-extruder has been found to be very useful. In the co-extrusion process the oil based filler is extruded within the biscuit dough and the co-extrusions continuously separated from the extrusion die by means of a cutting wire or iris. The net result is a dough piece with a fat based chocolate interior filling. These dough pieces are severed to produce dough pieces which are approximately 1½ inches in diameter and about ⅝ inches high. However, they can be produced in other sizes. These dough pieces are than baked in an oven for about 3 to 10 minutes at a temperature of about 300° F. to 400° F. During this period of time the biscuit dough gets baked. However, more importantly the chemical leavening agent in the dough has become activated. As a result the dough pieces rise with the interior surface becoming at least partially coated with the encapsulated oil filler with the bulk of the filler on the inner bottom surface of the cookie. There is also produced a void space within each of the cookies. The water based filler material is the injected into the biscuit to essentially fill the biscuit. One or more holes are placed in the top of the biscuit and or a weakened area is provided. This is for the exuding of the water based filler during the subsequent heating step by the consumer.

There are many ingredients that are utilized in the various parts of this present cooking process. As has been discussed the biscuit portion can be a vanilla biscuit, a chocolate biscuit, or a graham biscuit. Likewise the use of other types of biscuits are possible. It is only necessary that the cookie dough be coextrudable and that it has the property of rising to form an interior space upon the activation of a chemical leavening agent. Likewise in the production of the oil based filler, water based filler and the marshmallow syrup the various ingredients can be modified with regard to amounts or functional equivalents can be utilized for the substances that have been enumerated. Those in the art are aware of various substances that are functional equivalents for those that have been discussed herein. However, all such equivalent substances and amounts of substances that would give the same results are within a scope of the present invention.

As has been pointed out above the invention is directed to a very particular cookie. This particular cookie will exude a water based filler from the top area of the cookie during a microwave oven cooking by the consumer. The net result is a hot filled cookie which has some of the previously contained filling now coating the exterior surface of the biscuit portion of the cookie. This in essence is a type of a home made cookie. The operations performed by the consumer consist of heating the cookie and fully changing the appearance of the cookie.

The present invention will now be discussed with reference to the following examples.

EXAMPLE 1

This example illustrates how to make a vanilla cookie dough.

A vanilla cookie dough was made by mixing 27.75 pounds of fine granulated sugar, 26 pounds of vegetable shortening, 1.5 pounds of starch, 18 pounds of corn syrup, 1.75 pounds of dry whey powder, 1.4 pounds of salt, 1.75 pounds of dry whole eggs, 1 pound of dry egg albumin and minor amounts of vanilla and cocoa flavorants. These ingredients were mixed under high shear conditions to form a mixture with a cream consistency. Mixing time was about 5 minutes. Seven pounds of water was then added and the water blended into the cream mixture. Then the 100 pounds of flour and 2.1 pounds of chemical leavening agent were added. Mixing was continued until a tacky dough mass was produced. This dough was suitable for use in the co-extrusion process to make the present cookies.

EXAMPLE 2

This example illustrates how to make a chocolate cookie dough.

The procedure of Example 1 was repeated except that 12 pounds of cocoa and 1 pound of chocolate liquor were added to the mixture of fine granulated sugar, shortening and other ingredients. These were then all mixed together to form the cream mixture. In the second step 36 pounds of water was added to this mixture and blended into the cream mixture. The flour and the chemical leavening agent were then added and the mixing continued. The result is a chocolate dough that can be co-extruded with a filler material.

EXAMPLE 3

This example illustrates how to make a marshmallow syrup.

100 pounds of a regular corn syrup and 189 pounds of a high fructose corn syrup were heated to 130° F. A second solution was prepared consisting of 4.1 pounds of gelatin, 0.25 pounds of vanillin and 15.25 pounds of water. This second solution was mixed and added to the mixture of corn syrup and high fructose corn syrup. This marshmallow syrup was then stored at about 88° F. to 90° F. prior to usage.

EXAMPLE 4

This example illustrates how to make the oil base filler material.

Fine granulated sugar in an amount of 100 pounds was mixed with 35 pounds of cocoa, 7 pounds of dry whole milk powder, 16.5 pounds of hazel nut paste, 33 pounds of peanut oil, 5.75 pounds of monoglyceride, 35 pounds of red dutched cocoa and minor amounts of vanilla and chocolate flavorants. These ingredients were mixed to form a paste and transformed to three roll milling equipment and processed through three passes. 56.8 pounds of soybean oil and 1.2 pounds of lecithin were added and the full mixture mixed to integrate the soybean oil and lecithin. After mixing, this oil based filler is stored in a sealed container for use.

EXAMPLE 5

This example illustrates how to make the water based filler for the cookie.

Fine granulated sugar in an amount of 18 pounds was dry blended with 6.7 pounds of tapioca starch, 5 pounds of dextrose monohydrate, 3 pounds of red dutched cocoa, 0.5 pounds of salt and 0.125 pounds of natural chocolate flavor. After these ingredients have been blended, 18 pounds of a high fructose corn syrup, 30 pounds of regular corn syrup and 20 pounds of water were added to the blend and the mixture heated at atmospheric pressure in a steam jacketed kettle at about 270° to 280° F. for 20 to 25 minutes. The steam pressure is about 3 to 6 pounds per square inch. The mixture has a soluble solids content of at least 77%.

With the heating discontinued 6 pounds of chocolate liquor, 5 pounds of cocoa compound, 13.5 pounds of shortening and 0.125 pounds of lecithin are added while the mixture cools. The mixture was in the form of a liquid and was maintained in storage for use.

In order to make the water based filler 25% by weight of the marshmallow mix of Example 3 was incorporated with 75% by weight of the chocolate filler of this Example 5 which was at a temperature of about 105° F. to 110° F. These were thoroughly mixed and used for injection into the cookies.

EXAMPLE 6

This example illustrates the making of the filled cookie.

The dough of Example 1 and the oil based filler of Example 4 were fed to a Rheon co-extruder using an iris cutter. The outer co-extruded layer was the dough layer and the inner co-extruded layer was the fat based filler. The co-extruded pieces were formed to a size of 1½ inches in diameter and ⅞ inches in height. The dough weight is about 8 grams per dough piece and the filler weight about 6 grams per dough piece. The extruded dough pieces were baked for about 7 minutes at about 350° F. The moisture content of the baked pieces was 4.5 to 5.5 weight percent.

After the baked cookies emerge from the oven they are injected with about 3.5 grams of the water based filler of Example 5. This water based filler was added by means of needle injection. There will also at this time be placed on the cookie a number of small holes or a weakened area. This is to permit the water based filler to exude from the top of the cookie during the final baking. The final cookie will have a count of about 26 to 28 cookies per pound.

EXAMPLE 7

This example illustrates how to make a graham biscuit for the filled cookies.

In this embodiment 40 pounds of wheat flour, 30 pounds of graham flour, 21 pounds of fine granulated sugar, 12.5 pounds of vegetable shortening, 9.5 pounds of molasses, 7.5 pounds of high fructose corn syrup and 1.25 pounds of salt were mixed in a low shear mixer to produce a cream consistency mixture. This mixing required about 5 minutes. Then 1.25 pounds of ammonium bicarbonate dissolved in 21 pounds of water was added with low shear mixing continued for about 2 minutes. The flour and the chemical leavening agent were then added and the mixing continued to form the final dough. This dough was then stored for use.

EXAMPLE 8

This example illustrates the baking of the baked and filled cookies of Example 6 in a microwave oven.

Six of the baked cookies were placed on a plastic sheet in a 600 watt microwave oven. The oven setting was set to high. The cookie heats and the water based filling exudes from the cookie within 20 seconds. The cookies were removed from the microwave oven and cooled. They have a fresh home baked taste.

What is claimed is:

1. A cookie comprising a baked dough-based shell containing therein at least two filters, said cookie having a weakened portion or at least one opening on its upper surface so that during a subsequent heating step at least one of said filters can flow from said weakened portion or opening and at least partially coat the outer surface of the cookie, at least one of said filters being an oil based filter and at least one of said filters being a water based filter.

2. A cookie as in claim 1 wherein said water based filter is located on said oil based filter and said water based filter exudes from the cookie upon heating.

3. A cookie as in claim 1 wherein said upper surface has at least one opening.

4. A cookie as in claim 1 wherein said oil based filter and said water based filter each contain a flavorant.

5. A cookie as in claim 4 wherein said flavorant is selected from the group consisting of vanilla, chocolate, fruits, nuts, mint and mixtures thereof.

6. A cookie as in claim 4 wherein said water based filter contains marshmallow.

7. A method of making cookies which contain fillers, said cookie having a weakened portion or at least one opening in the upper portion thereof, comprising subjecting said cookies to heat whereby at least one of said fillers within said cookies overflows through the upper weakened portion or at least one opening to thereby at least partially coat the outside surface of the cookies, at least one filler being an oil based filler and at least one filler being a water based filler.

8. A method as in claim 7 wherein primarily said water based filler exudes from the cookie during heating.

9. A method wherein said heat is provided by microwave energy.

10. A method as in claim 8 wherein said fillers contain a flavorant selected from the group consisting of vanilla, chocolate, fruits, nuts, mint and mixtures thereof.

11. A method as in claim 7 wherein said water based filler contains marshmallow.

12. A method of making a filled cookie comprising:
 (a) co-extruding a dough and an oil based filler to form individual dough pieces;
 (b) baking the individual dough pieces whereby the dough pieces expand to form additional space within the dough pieces and said oil based filler coats at least part of the interior surface of said dough pieces; and
 (c) injecting a water based filler into the baked dough pieces.

13. A method as in claim 12 wherein the top of said baked dough pieces have at least one opening therethrough.

14. A method as in claim 12 wherein the top of said dough pieces have a weakened area on the upper surface thereof.

15. A method as in claim 12 wherein each of said fillers contains a flavorant.

16. A method as in claim 13 wherein said flavorant is selected from the group consisting of vanilla, chocolate, fruits, nuts, mint and mixtures thereof.

17. A method as in claim 14 wherein said dough is selected from the group consisting of vanilla doughs, chocolate doughs and graham doughs.

18. A method as in claim 12 wherein said water based filler contains marshmallow.

* * * * *

UNITED STATES PATENT AND TRADEMARK OFFICE
CERTIFICATE OF CORRECTION

PATENT NO.   :  4,948,602
DATED        :  August 14, 1990
INVENTOR(S)  :  Donald G. Boehm, et al It is certified that error appears in the above-indentified patent and that said Letters Patent is hereby corrected as shown below:

Column 10, lines 5, 8, 10 and 11, the word "filters" should be deleted and the word --fillers-- substituted therefor;

Column 10, lines 11, 12, 14, 15, 18, 19 and 24, the word "filter" should be deleted and the word --filler-- substituted therefor.

Signed and Sealed this

Third Day of August, 1993

Attest:

MICHAEL K. KIRK

*Attesting Officer*       *Acting Commissioner of Patents and Trademarks*